Dec. 2, 1941.  J. A. CARLIN ET AL  2,264,360
ABRADING TOOL
Filed Aug. 14, 1939  3 Sheets-Sheet 1
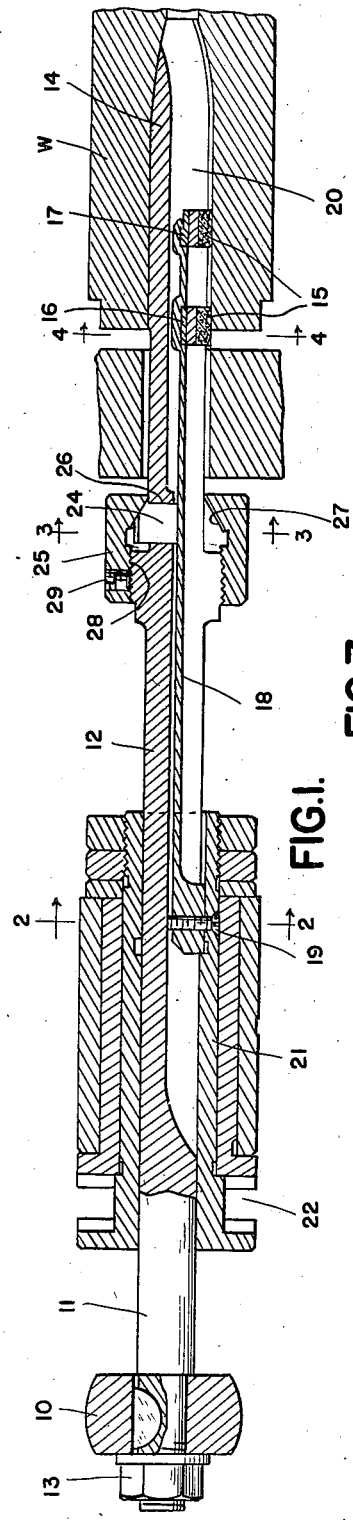
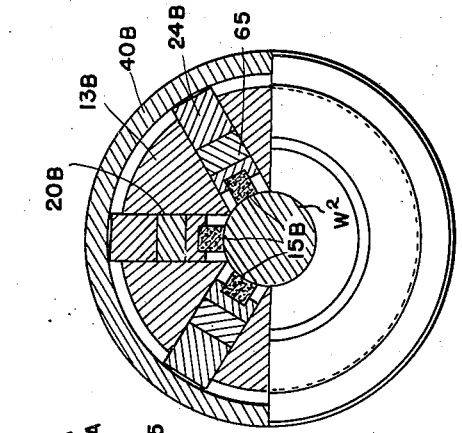
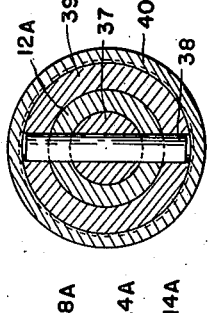
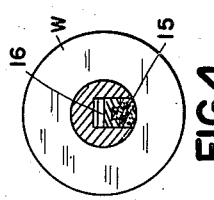
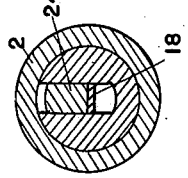
INVENTORS
JOSEPH A. CARLIN
CARL W. FLOSS
BY
ATTORNEYS Dec. 2, 1941.  J. A. CARLIN ET AL  2,264,360
ABRADING TOOL
Filed Aug. 14, 1939  3 Sheets-Sheet 2

INVENTORS
JOSEPH A. CARLIN
CARL W. FLOSS
BY
ATTORNEYS

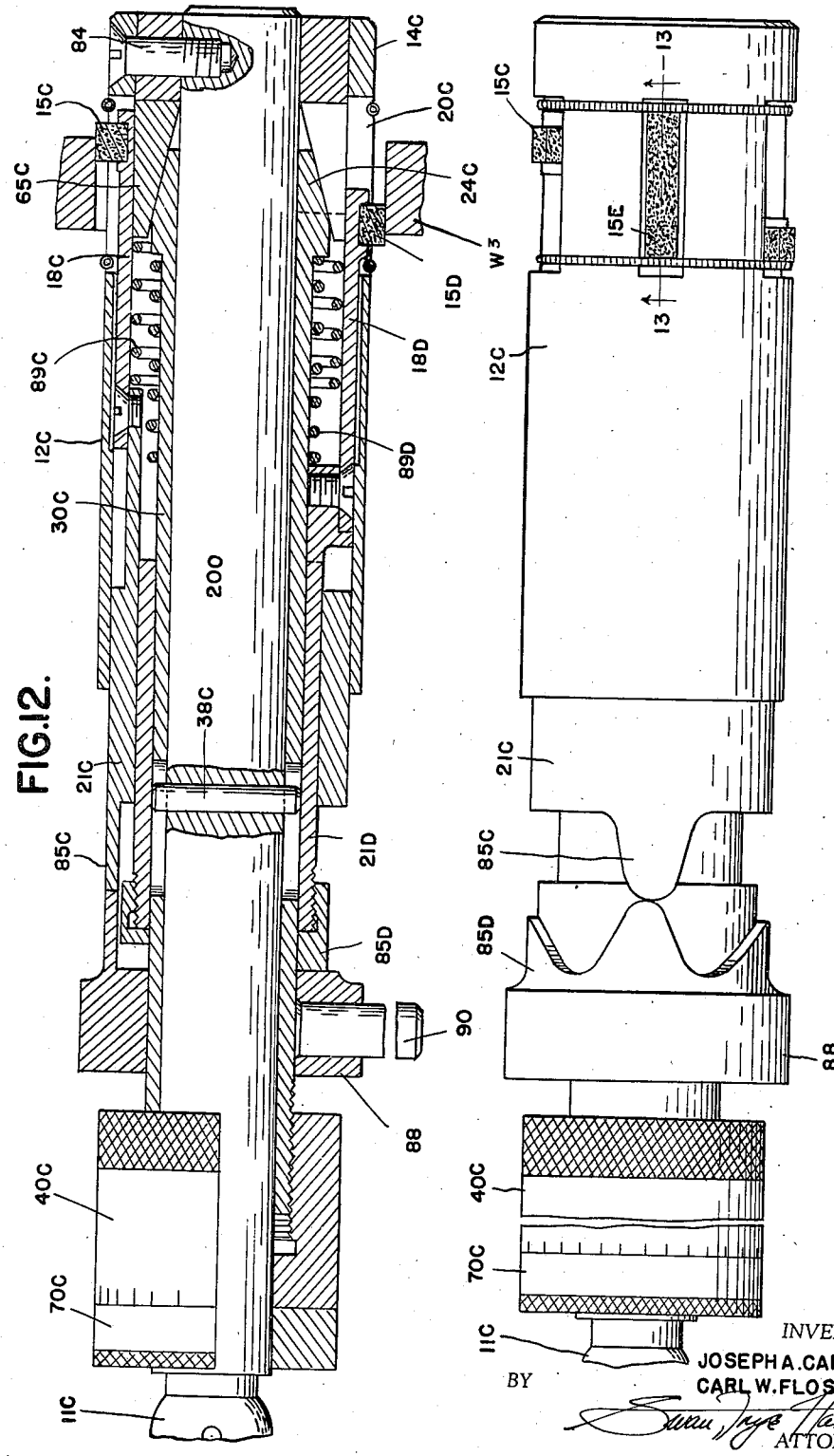

Patented Dec. 2, 1941

2,264,360

UNITED STATES PATENT OFFICE 2,264,360

ABRADING TOOL

Joseph A. Carlin and Carl W. Floss, Detroit, Mich., assignors to Honing Equipment Corporation, Detroit, Mich., a corporation of Michigan Application August 14, 1939, Serial No. 290,018

11 Claims. (Cl. 51—184.3)

This invention relates to tools for grinding, honing, lapping and the like, and aims to provide an improved mechanism of this character which is adapted for both internal and external work, and which is capable of following and working upon irregular contours, of a character which it has not heretofore been possible to hone or lap satisfactorily by mechanical means.

A further object is to provide in such tools improved means for imparting to the abrasive, or other working elements, a compound movement which greatly assists in securing a fine finish, and which considerably speeds the work.

Another object is to improve the adjusting and take-up mechanism of such devices, to compensate for wearing away of the abrasives as well as to feed the same into the work, which adjusting means is more readily accessible and more quickly operable than previously known arrangements. A further and related object is to provide such feeding and take-up means which does not interfere with reciprocation of the abrasives in the tool and independently of the tool as a whole, and which, further, permits such independent movement of the abrasives in irregular or non-concentric paths, to allow the device to work upon a wide variety of shapes in addition to straight cylindrical bores or holes and cylindrical surfaces.

Still another object is to provide a tool of the character indicated which is capable of working upon the exterior of elongated rods and the like, and to finish such a continuous surface which is much longer than the tool itself, and in fact of any desired length, novel means being provided whereby the work may be fed through the interior of the tool itself.

Other objects and advantages will be apparent from the following description, wherein reference is made to the accompanying drawings illustrating preferred embodiments of our invention and wherein similar reference numerals designate similar parts throughout the several views.

In the drawings:

Fig. 1 is a central longitudinal sectional view of a honing tool constructed in accordance with the present invention.

Figures 2, 3 and 4 are cross sectional views thereof taken substantially on the lines 2—2, 3—3, and 4—4, of Figure 1, respectively, and looking in the direction of the arrows.

Figure 5 is a view similar to Figure 1 showing a modified form of the invention.

Figures 6, 7 and 8 are sectional views taken substantially on the lines 6—6, 7—7, and 8—8, respectively, of Figure 5, and looking in the direction of the arrows.

Figure 9 is a view similar to Figure 1 showing another modified construction.

Figure 10 is a cross section taken substantially on the line 10—10 of Figure 9, and looking in the direction of the arrows.

Figures 11 and 12 are side and longitudinal sectional views, respectively, of another modified construction; and Figure 13 is a sectional detail taken substantially on the line 13—13 of Figure 11, and looking in the direction of the arrows.

Referring now to the drawings.

The tool shown in Figures 1, 2, 3 and 4 is adapted to be either fixedly mounted upon the bed of a machine (not shown) or rotatably mounted upon a spindle or other suitable driving means (also unshown). A bracket 10 is shown, indicating means for fixedly supporting the tool, while the work, W, is arranged to be rotated in engagement with the abrasive 15. The shank 11 of the tool is tightly secured in the bracket as by means of a nut 13, while a continuation 12 of the shank constitutes the body of the tool and terminates in a nose 14 also shown as integral with the body of the tool, and shaped to fit into the work and to act as a pilot. The abrasives, which may comprise stones of suitable characteristics, are secured in holders 16, 17, which are in turn attached to a cantilever leaf spring 18 which, with the abrasives, is slidable in a longitudinal slot 20 in the body of the tool. The rear end of the elongated spring is fastened by means of a screw 19 to a sleeve assembly 21, provided at one end with a peripheral slot 22. The sleeve assembly is slidable along the body of the tool to move the abrasives in and out of the work, and the slot 20 is of sufficient depth to allow them to move freely radially in following the contour of the work.

The feeding tension of the spring is adjustable by means of a radially slidable plunger 24, projecting through an aperture 26 in the body and having an inclined outer surface engageable with the frusto-conical inner surface 27 of a sleeve 25, the farther end of which is threaded to fit a complementarily threaded enlarged portion 28 of the body. A set screw 29 enables the sleeve to be locked in any adjusted position. By adjustment of the sleeve, the plunger 24 may be made to exert more or less pressure against the back of the spring 18, thus controlling the working pressure of the abrasives. The spring is freely slidable over the plunger at all times, however, to permit reciprocation of the abrasives.

The lower surface of the slot 20 will be seen to be shaped conformably to the contour of the work surface, to allow the abrasives to move freely in following the work.

The embodiment illustrated in Figures 5, 6, 7 and 8 is adapted to hone internal tapered surfaces, and with very slight changes which will readily be apparent to those skilled in the art is adaptable to work of widely differing contours. In the shown embodiment the work, W', is provided with a frusto-conical inner surface. The nose 14A of the body 12A of the tool is shaped to conform to the opening in the work and to fit accurately but rotatably thereinto. The abrasive 15A is secured in a carriage 18A rollable upon the inclined surface of a tapered track member 24A, which also constitutes an adjustable feed element for the abrasive, being longitudinally slidable in the slot 20A in the tool body in which it and the abrasive and carriage assembly are accommodated. The slope of the track surface will be seen to correspond to the shape of the work, and in view of the opposite taper of the bottom surface of slot 20A, the carriage may be fed radially outward by sliding the track forwardly, and may be allowed to move radially inward by retracting the track. Such control of the track is effected by longitudinal movement of an axially disposed plunger 30, flattened at its forward end and fitted into a slot 33 in the track cam 24A. A pin 35 extends through a slot 36 in the shaft, and through the rear extremity of the track cam, to allow the latter to move up and down with respect to the axially movable plunger 30 as it is adjusted longitudinally along the inclined bottom of the slot 20A. At its rear extremity the plunger is provided with an enlarged extremity 37 through and from which extends a pin 38 engaging at each end a threaded ring 39, the outer surface of which is threaded conformably to the inner threaded surface of an adjusting collar 40, rotatably mounted upon the body of the tool but held against longitudinal movement, so that by rotation thereof the track cam may be moved inwardly our outwardly of the nose of the tool, to radially project or retract the abrasive or other working element.

The extent of rotation of the adjusting sleeve is normally limited by a stop pin 71 secured to and projecting downwardly from a stop ring 70 in such position as to be engageable by a cooperating pin 74 projecting upwardly from adjusting sleeve 40. Both pins may if desired project into a slot 75 in the upper end of the adjusting sleeve, so that the pins are concealed when the stop ring is in its normal abutting relation to the adjusting sleeve. The stop ring is normally held against rotation with respect to the body of the tool by serrations 77 encircling the tool body in position to be engaged by complementary serrations carried by the stop ring. The serrated portion of the stop ring is provided by serrations formed upon the inner end of a screw 78, which is not screwed in tightly enough to set the parts tightly, but allows the stop ring to slide longitudinally, the complementary serrations acting as splines, allowing the ring to slide but not to turn upon the tool body. The arrangement will be seen to be such as to allow the serrated parts to be disengaged, to permit the screw 78 to travel freely in a slot 79, thus allowing the ring to be turned to reset the stop at any desired position when desired, to compensate for wear of the abrasives, etc. A spring-pressed ball detent 80 normally maintains the stop ring in locked position, but is releasable when sufficient effort is exerted upon the ring to move it away from the adjusting sleeve.

The abrasive is reciprocable along the inclined top of the track cam independently of the remainder of the tool, the track cam being shaped to maintain it in engagement with the work. Reciprocation of the stones or abrasive is effected by means of a sleeve assembly 21A, slidable upon the tool body and connected to the carriage by a link 45 articulated to the sleeve assembly and to the carriage, and arranged to travel freely in the slot 20A. Being swingable in the slot and pivoted at both ends, the link does not interfere with radial adjustment of the carriage during movement of the track cam.

The means for reciprocating the abrasive is shown as comprising a hydraulic cylinder 90 within which is a piston 92 having a rod 93 connected by means of a yoke 50 to the sleeve 21A, the yoke being fitted in a groove 22A therein and acting when the piston is reciprocated by hydraulic pressure from a suitable source (not shown) to reciprocate the sleeve 21A and so the abrasive 15A. The hydraulic fluid is supplied through a feed pipe 95 and a two-way valve 97 which alternately directs the fluid on opposite sides of the piston, the valve being tripped automatically by valve rod 98 actuable by movement of the piston to change the flow of fluid and reverse the movement of the piston as the latter approaches the end of its stroke.

The tool body is shown as provided with a tapered shank 11A having a cross pin 52 adapted to project into a conformably shaped socket 54 formed in the spindle 55 of the machine (fragmentarily shown at 100) which drives the tool. The spindle carries a nut 57 engageable with the pin 52 and which when screwed up locks the tool in the machine.

A further modification shown in Figures 9 and 10 is adapted to hone the external surface of cylindrical work, designated W², which may be fed continuously or in any desired lengths through the hollow interior of the tool. It will be understood that the spindle of the machine by which the tool is driven may likewise be of hollow construction to permit such continuous feed. The enlarged head 14B of the tool is provided with a plurality of radial slots 20B, extending longitudinally thereof. These slots are radially aligned with the abrasives 15B, which are individually carried in elongated holders 16B. The holders extend rearwardly and all are secured, as by means of screws 19B, to a sleeve 21B, slidable along the body of the tool and actuable, as by means of the yoke 50B, to reciprocate the abrasives along the surface of the work. The out-turned rear ends of the holders 16B which receive the screws 19B project through slots 62 in the shank of the tool. The holders 16B are sufficiently flexible to permit radial adjustment of the stones, and are longitudinally slidable while in engagement with the thrust members 65.

One of the thrust members 65 is trapped and radially movable in each of the slots 20B, behind the abrasive holder 16B. Each member 65 has a tapered outer surface and is movable inwardly, to force the stone against the work, by means of an adjusting cam 24B. The cams are shorter than the presser members, and longitudinally slidable in the slots 20B. Each cam is keyed to move longitudinally with the adjusting collar 40B, portions of the collar overhanging each end of each cam. The collar is threaded and rotatable upon the body 13B. It will be seen that when the collar is rotated, therefore, the cam 24B is carried lengthwise along the tool, its inward movement serving to force the abrasives into the work, while outward movement thereof relieves the pressure upon the abrasives. The inner end of the adjusting collar carries a lock ring 66 threaded or otherwise secured thereupon and overhanging the inner ends of the adjusting cams 24B, between which and the lock ring a bearing ring as 67 may also be interposed.

The shank of the tool is provided with a ball portion 12B from which pins 52B project radially to engage a suitable coupling (unshown) carried by the spindle of the driving machine (also unshown).

In the modified construction shown in Figures 11 and 12 the body 12C of the tool is secured to a central shaft 200, rotatable, through the coupling portion 11C, by any suitable machine or driving mechanism (not shown). The body is secured to the central shaft by a screw 84 extending through the head portion 14C of the body by a set screw 84, and provided with longitudinal slots 20C through certain of which extend longitudinally reciprocable stones or other working abrasives 15C, these being also radially movable. The stones are arranged in sets, the stones designated 15C secured to a sleeve 21C, while the stones designated 15D are secured to another sleeve, 21D. The sleeves 21C, 21D are concentric with and independently slidable upon the tool body, the stones being mounted in individual holders 16C, 16D, projecting rearwardly inside the body, and individually secured to the sleeves 21C, 21D, respectively. An additional set of stones, 15E, are longer and held in the slots against longitudinal movement but movably radially therein. The stones 15E are mounted in holders 16C which are radially movable, thru thrust blocks 65D, by the same adjusting cam 24C which controls the radial positioning of the stones 15C, 15D. The tool body is both rotatable and reciprocable by the machine, so that the stones 15E are rotated and moved longitudinally while in contact with the work. Endless springs 202 encircle the head of the tool and bear inwardly upon the stone holders 65D to retract abrasives 15E.

The sleeves 21C, 21D are provided with follower portions 85D respectively, adapted to engage a cam 88, encircling and free upon the tool, and adapted to be held against rotation therewith by means of a stud 90. The sleeves and their followers, being keyed to the tool body to rotate therewith, are driven longitudinally by the cam 88 when the tool is rotated and the cam held against rotation. Springs 89C, 89D serve to return the sleeves and followers and keep the latter in proper engagement with the cam.

Between the actuating sleeves and tool body is an adjusting sleeve 30C, also longitudinally slidable along the body, but keyed to rotate therewith by means of a pin 38C projecting through the body and through slots (undesignated) in the sleeve.

A frusto-conical cam portion 24C carried at the end of the adjusting sleeve bears outwardly against thrust blocks 65C, 65D, one of which is arranged beneath each tool holder. The tool holders 16C, 16D are flexible, and adapted to be flexed outwardly when the blocks 65C are forced outwardly with sufficient force by the adjusting cam 24C, while when such pressure is relaxed, the stone holders tend to return to indrawn position. An adjusting collar 40C is rotatable upon the tool body, but keyed thereto against longitudinal movement, and threaded to engage the complementarily threaded extremity of the adjusting sleeve 30C, so that by rotation of collar 40C the cam 24C may be moved longitudinally, to adjust the feed in the manner described. A stop ring 70C may also be provided, the arrangement and operation of which may correspond to those of the stop ring 70 described in connection with the embodiment of Figure 5.

The cam 85D is of undulating contour, and followers 21C, 21D are preferably so arranged that the stones 15C, 15D are moved in opposite directions by the cam, although it will be appreciated that the followers may be positioned in any desired relative positions with respect to the high and low portions of the cam, to give the abrasives any of various different relative motions, while a compound motion is imparted thereto by reciprocation of the tool as a whole, which gives a still different motion to stones 15E.

We are aware that the invention may be embodied in other specific forms without departing from the spirit or essential attributes thereof, and we therefore desire the present embodiments to be considered in all respects as illustrative and not restrictive; reference being had to the appended claims rather than to the foregoing description to indicate the scope of the invention.

It will be understood that the words "stone" and "abrasive" are used herein in the usual trade sense as meaning any of the commercially available and suitable "abrasive sticks," which are made of natural or artificial stone; usually the latter, although the type of abrasive may be varied as desired.

What we claim is:

1. In a tool of the character described, in combination with a suitable support, a tool body having a head portion adapted to project longitudinally in overlapping engagement with work to be treated, a working element carried by the head and movable both longitudinally and radially thereof, means including a radially movable thrust member for moving the working element radially into engagement with the work, said working element being longitudinally slidable with respect to said thrust member, and means for moving said working element longitudinally independently of said head portion and thrust member while in engagement with the work.

2. In a tool of the character described, in combination with a suitable support, a tool body having a head portion adapted to project longitudinally into overlapping engagement with the work to be treated, a working element carried by the head portion and movable both longitudinally and radially thereof, means including a movable thrust portion for moving the working element radially into engagement with the work, actuating means for said thrust portion and independent actuating means for said working element for moving the same longitudinally independently of said head and along said thrust portion.

3. Means as set forth in claim 2 in which said thrust portion comprises a combined cam and track element having that face along which the working element moves contoured conformably to the work to be treated, whereby upon longitudinal actuation of the working element therealong it serves to guide said element in a predetermined work-forming path.

4. Means as set forth in claim 2 in which said thrust portion comprises a combined cam and guide element having that face along which the working element moves disposed non-concentrically with respect to the axis of the tool, and contoured conformably to the work to be treated, said actuating means for the working element allowing lateral movement between itself and said working element, whereby when said working element is moved longitudinally, it may travel laterally, guided by said combined cam and guide element.

5. Means as set forth in claim 2 in which said thrust portion comprises a longitudinally slidable wedge-like cam, said actuating means therefor comprising a member keyed thereto for longitudinal movement therewith but laterally movable with respect thereto, said thrust portion also being movable radially of the tool.

6. In a tool of the character described, in combination with a supporting body, a head adapted to project longitudinally in overlapping engagement with work to be treated, means for rotating and reciprocating said head, a working element carried by the head and movable both longitudinally and radially thereof, means for moving the working element radially into engagement with the work, and means for reciprocating said element longitudinally with relation to both the head and the work, while said working element is in engagement with the work, said means for moving the working element into engagement with the work comprising a resilient spring element, and means for changing the effective pressure of said spring element without interfering with longitudinal movement of said element.

7. In a tool of the character described, in combination with a supporting body, a head adapted to project longitudinally in overlapping engagement with work to be treated, means for rotating and reciprocating said head, a working element carried by the head and movable both longitudinally and radially thereof, means for moving the working element radially into engagement with the work, and means for reciprocating said element longitudinally with relation to both the head and the work, while said working element is in engagement with the work, said means for moving said element into engagement with the work comprising a spring element movable longitudinally with said element, and means for changing the effective tension of said spring element, comprising a laterally adjustable abutment carried by the body and slidably engageable by said spring element.

8. In a tool of the character described, in combination with a suitable support, a tool body having a head portion adapted to project longitudinally into overlapping engagement with work to be treated, and adapted to be rotated and reciprocated, a working element movable both longitudinally and radially in the head, means for moving said working element radially into engagement with the work, and means for reciprocating said working element longitudinally with relation to both the head and the work while said head is being rotated and reciprocated and while said working element is in engagement with the work, to impart a compound motion to said working element.

9. In a tool of the character described, in combination with a suitable support, a tool body having a head portion adapted to project into overlapping engagement with the work and having a bearing upon the work to guide the tool with respect to the work, means for rotating and reciprocating the head, a working element carried by and rotatable with the head and movable radially and longitudinally independently thereof, means for feeding the working element radially into engagement with the work, means for reciprocating the working element longitudinally with relation to the head, and means for guiding the working element in a path arranged at an angle to the axis of the tool during such reciprocation.

10. In a tool of the character described, in combination with a supporting body, a head adapted to project longitudinally in overlapping engagement with work to be treated, means for rotating and reciprocating said head, a working element carried by the head and movable both longitudinally and radially thereof, means for moving the working element radially into engagement with the work, and means for reciprocating said element longitudinally with relation to both the head and the work, while said working element is in engagement with the work, said head being provided with a track along which said working element is longitudinally movable in a path inclined with respect to the axis of the tool, said track serving as a cam and said working element having follower portions bearing thereagainst at two longitudinally spaced points.

11. In a tool of the character described, in combination with a supporting body, a head adapted to project longitudinally in overlapping engagement with the work to be treated, means for rotating and reciprocating said head, a plurality of working elements carried by the head and movable longitudinally and radially thereof, means for moving the working elements radially into engagement with the work, and means for reciprocating said elements longitudinally with relation to both the head and the work, while said working elements are in engagement with the work, and while said head is being rotated and reciprocated, comprising an actuating portion carried by and rotatable with said head and operatively connected to said working elements, a cooperating actuating portion for driving the first mentioned actuating portion and thereby moving the working elements, means preventing movement of said second mentioned actuating portion with the working elements, whereby to impart the aforesaid relative reciprocation to said working elements, said actuating portions comprising a cam adapted to be held against rotation with the tool body, and a plurality of followers actuable by relative rotation between said followers and said cam means, said followers being connected to the working elements to reciprocate the latter with relation to each other and the work, as well as with relation to the tool body.

JOSEPH A. CARLIN.
CARL W. FLOSS.